United States Patent [19]
Marinero et al.

[11] Patent Number: 5,989,674
[45] Date of Patent: Nov. 23, 1999

[54] THIN FILM DISK WITH ACICULAR MAGNETIC GRAINS

[75] Inventors: Ernesto Esteban Marinero, Saratoga; Timothy Martin Reith, Morgan Hill; Brian Rodrick York, San Jose, all of Calif.

[73] Assignee: International Business Machines Corporation, Armonk, N.Y.

[21] Appl. No.: 09/079,907

[22] Filed: May 15, 1998

[51] Int. Cl.$^6$ .................................................. G11B 5/66
[52] U.S. Cl. ................... 428/65.3; 428/65.6; 428/141; 428/325; 428/329; 428/331; 428/694 T; 428/694 TS; 428/694 BA; 428/694 TR; 428/694 BR; 428/900; 204/192.2; 427/128; 427/129; 427/130
[58] Field of Search .......................... 428/141, 694 T, 428/694 TS, 694 BA, 694 TR, 694 BR, 900, 65.3, 65.6, 325, 329, 331; 204/192.2; 427/128–130

[56] References Cited

U.S. PATENT DOCUMENTS

| | | | |
|---|---|---|---|
| 4,287,225 | 9/1981 | Kneller et al. | 427/599 |
| 4,405,677 | 9/1983 | Chen | 428/172 |
| 4,480,004 | 10/1984 | Togawa | 428/329 |
| 4,735,840 | 4/1988 | Hedgcoth | 428/65.5 |
| 5,053,250 | 10/1991 | Baseman et al. | 427/131 |
| 5,147,734 | 9/1992 | Nakamura et al. | 428/694 T |
| 5,352,501 | 10/1994 | Miyamoto et al. | 428/65.7 |
| 5,490,809 | 2/1996 | Jones et al. | 451/60 |
| 5,516,547 | 5/1996 | Shimizu | 427/132 |
| 5,523,173 | 6/1996 | Doerner et al. | 428/611 |
| 5,620,574 | 4/1997 | Teng et al. | 204/192.15 |

OTHER PUBLICATIONS

D. E. Laughlin et al., "The Control and Characterization of the Crystallographic Texture of Longitudinal Thin Film Recording Media", IEEE Trans. on Magnetics, vol. 32, No. 5, Sep. 1996, pp. 3632–3637.

T. C. Arnoldussen et al., "Obliquely Evaporated Iron–Cobalt and Iron–Cobalt–Chromium", IEEE Trans. on Magnetics, vol. MAG–20, No. 5, Sep. 1984, pp. 821–823.

A. Kawamoto et al., "Magnetic anisotropy of sputtered media induced by textured substrate", J. Appl. Phys. 69(8), Apr. 15, 1991, pp. 5151–5153.

E. Teng et al., "Anisotropy Induced Signal Waveform Modulation of DC Magnetron Sputtered Thin Film Disks", IEEE Trans. on Magnetics, vol. MAG–22, No. 5 Sep. 1986, pp. 579–581.

*Primary Examiner*—Leszek Kiliman
*Attorney, Agent, or Firm*—G. Marlin Knight

[57] ABSTRACT

A thin film disk and a disk drive using the thin film disk are described. The disk has a thin film magnetic layer composed of small acicular grains having an average aspect ratio greater than one which results in improved recording performance. The development of the acicularity is aided through the crystal structure having anisotropic inplane stress with a radial stress being less than a tangential stress. The preferred magnetic material is an alloy cobalt which includes a glass forming material such as boron, boron oxide, silicon, silicon oxide, carbon, phosphorus, etc. The typical hcp unit cells form acicular grains with a tendency for the C-axis to be orthogonal to a long axis of the acicular grains. Preferably the C-axis of the grains is oriented along the circumferential direction of the disk. Preferably the underlayer is sputtered deposited using negative bias.

41 Claims, 2 Drawing Sheets

THIN FILM DISK WITH ACICULAR MAGNETIC GRAINS

FIELD OF THE INVENTION

This invention relates to the field of data storage devices such as disk drives having thin film magnetic disks. More particularly the invention relates to microstructure of the thin film magnetic alloys and their effect on recording characteristics.

BACKGROUND OF THE INVENTION

The thin film magnetic recording disk in a conventional drive assembly typically consists of a substrate, an underlayer consisting of a thin film of chromium (Cr) or a Cr alloy, a cobalt-based ferromagnetic alloy deposited on the underlayer, and a protective overcoat over the magnetic layer. The word "magnetic" will be used to mean ferromagnetic, antiferromagnetic, ferrimagnetic or any other magnetic material suitable for magnetic recording. A variety of disk substrates such as NiP-coated AlMg, glass, glass ceramic, glassy carbon, etc., have been used. The microstructural parameters of the magnetic layer, i.e., crystallographic preferred orientation (PO), grain size, anisotropy and magnetic exchange decoupling between the grains, play key roles in the recording characteristics of the disk. The Cr underlayer is mainly used to control such microstructural parameters as the PO, the unit cell size and grain size of the cobalt-based magnetic alloy.

One variation of the layer structure described above uses a very thin seed layer on a non-metallic substrate to establish an appropriate nucleation base for the underlayer. Various materials have been used or proposed for seed layers, for example, Al, Cr, $Ni_3P$, Ta, C, W, FeAl and NiAl. Laughlin, et al., have described use of an NiAl seed layer followed by a Cr underlayer and a CoCrPt magnetic layer. The NiAl seed layer with the Cr underlayer was said to induce the [10$\bar{1}$0] texture in the magnetic layer. (See "The Control and Characterization of the Crystallographic Texture of Longitudinal Thin Film Recording Media," IEEE Trans. Magnetic. 32(5) Sept. 1996, p.3632).

The PO of the various materials forming the layers on the disk, as discussed herein, is not necessarily an exclusive orientation which may be found in the material, but is merely the most prominent orientation. When the Cr underlayer is sputter deposited at a sufficiently elevated temperature on a NiP-coated AlMg substrate a [200] PO is usually formed. This PO promotes the epitaxial growth of [11$\bar{2}$0] PO of the hexagonal close-packed (hcp) cobalt (Co) alloy, and thereby improves the magnetic performance of the disk. The [11$\bar{2}$0] PO refers to a film of hexagonal structure whose (11$\bar{2}$0) planes are predominantly parallel to the surface of the film. (Likewise the [10$\bar{1}$0] PO refers to a film of hexagonal structure whose (10$\bar{1}$0) planes are predominantly parallel to the surface of the film).

Various designs of thin film disks with laminated magnetic layers are known. The typical laminated magnetic layers are cobalt alloys separated by a thin layer of non-magnetic material such as Cr or Cr alloy. Although the multiple magnetic layers in laminated disks are all typically composed of the same alloy, different materials can be used.

Since longitudinal recording requires that the C-axis be sufficiently oriented in the plane of the substrate, the range of thin film structures which might otherwise be used is restricted. Some QB alloys have certain advantages as described in U.S. Pat. No. 5,523,173, so it is useful to find ways to overcome the PO problem. The '173 patent describes special sputtering conditions which are useful in depositing QB on an AlMg/NiP substrate to pull the C-axis more strongly into the plane of the substrate. The desired orientation of the QB in the '173 patent is [11$\bar{2}$0] PO in which the C-axis is sufficiently confined in the plane of the substrate to be suitable for longitudinal recording. One of the conditions in the '173 method is approximately 300 volts of negative bias on the substrate during sputtering of the Cr underlayer.

The topography of the surface on which a thin film is deposited can have a significant effect on the way the film nucleates and grows and also upon its characteristics. So called circumferential texture on magnetic disks has been commonly used to influence the inplane magnetic anisotropy for a wide range of magnetic alloys. For longitudinal recording it is sometimes useful to have a higher coercivity (Hc) in the circumferential direction than in the radial direction. The ratio of the circumferential Hc to the radial Hc is called the orientation ratio (OR). For example, Kneller U.S. Pat. No. 4,287,225 states that he was able to obtain uniaxial magnetic anisotropy (i.e. OR>1) using circumferential texture with an amorphous SmCo alloy. Others have shown similar effects with body-centered cubic (bcc) alloys. (See Arnoldussen, et al., "Obliquely Evaporated Iron-Cobalt and Iron-Cobalt-Chromium Thin Film Recording Media," IEEE Trans. Magnetic., vol. Mag-20, No.5, Sept. 1984, p.821). Current disks typically use hexagonal close packed (hcp) cobalt alloys and most (but not all) circumferentially textured disks have an OR>1.

There are potentially conflicting views on the mechanisms behind the relationship between anisotropy and circumferential texture. Arnoldussen, et al., attributed the anisotropy of their disks to an enhancement of shape anisotropy. Others have claimed to have found that there is a preferential alignment of the C-axes of the hcp crystals parallel to the texture lines, but others have failed to find any such alignment. For example, Miyamoto, et al. in the specification of U.S. Pat. No. 5,352,501, filed in Japan on Dec. 21, 1989, appear to claim to have obtained some degree of preferential C-axis alignment along circumferential texture lines using CoCr(X) alloys where X is Ta, Nb, Pt, Pd, Ni, Zr, W, Mo or Hf. On the other hand, using a CoCrTa/Cr thin film circumferential textured disk Kawamoto and Hikami claim to have determined that magnetostriction was the mechanism underlying the anisotropy and that they saw no preferred crystallographic orientation in the plane of the disk. (A. Kawamoto and F. Hikami, "Magnetic anisotropy of sputtered media induced by textured substrate", J.Appl.Phys. 69(8), Apr. 15, 1991).

One factor contributing to shape anisotropy is the acicularity and orientation of the magnetic grains which in Cr/Co(X) disks are influenced by the underlayer grains. In the prior art elongated grains or particles of magnetic material have been used to control the "easy axis" of magnetization by aligning the long axis of the particles with the desired easy axis. Needle-like magnetic particles have been used to achieve in-plane anisotropy in particulate coated disks for several decades. The needle-like magnetic particles can be mixed with a liquid organic binder and poured onto the substrate in the presence of a magnetic field to orient the particles with the long axis in the plane of the disk and along the circumferential direction. This technique is obviously inapplicable to thin film disks. On thin film disks any acicularity of the grains must be inherent in the growth during the deposition process. Teng and Ballard claimed to have observed acicular magnetic grains on thin film disks (Cr/CoCr and Cr/CoNi) with the longer axis substantially aligned with the circumferential texture grooves and attributed the measured anisotropy to this. (E. Teng and N. Ballard, "Anisotropy Induced Signal Waveform Modulation of DC Magnetron Sputtered Thin Films Disks", IEEE Trans.Mag., vol.MAG-22, No.5, Sept.1986). However, it is not clear from Teng and Ballard's experimental procedure how the elongated grains were created and their result may have been due to hidden or unknown parameters. On typical current thin film disks the grains of the hcp magnetic material grow in an essentially cylindrical shape. It is also possible for the grains to grow in random irregular shapes which have no net acicularity.

The surfaces of the substrates have tended to become smoother as the areal density has increased. In 1984 Arnoldussen, et al. used circumferential texture of approximately 50 nm peak-to-valley. Present disks typically will have a peak-to-valley less than 10 nm. A 10 nm texture appears mirror-like to the untrained eye. Special polishing equipment is necessary to achieve circumferential texture this fine such as is described in Jones, et al., U.S. Pat. No. 5,490,809.

Various oxides and nitrides are suggested as dopants for a thin film magnetic layer in Shimizu, et al., U.S. Pat. No. 5,516,547. Silicon oxide, silicon nitride or boron nitride among others are suggested for alloying with CoPtCr to increase the coercivity and signal to noise ratio.

SUMMARY OF INVENTION

A thin film recording structure with a magnetic layer comprising small acicular grains and uniaxial anisotropy is described. While the films are being deposited, the grains grow on a disk surface whose stress in the radial direction in the film has been reduced, therefore, lowering the surface energy in the radial direction to encourage more rapid hcp crystal growth along the radial direction. In the following, the magnetic film of the invention will be referred to as a STRAG (stress relieved, acicular grain) film for convenience. The magnetic material, e.g. cobalt, is alloyed with a glass forming material to encourage a significant number of acicular grains to grow with an orientation that is influenced by the local substrate topography. The result is the growth of small, magnetically decoupled/isolated, acicular grains. The preferred magnetic recording medium for a STRAG film is a quaternary alloy of CoPtCrB. The grains are preferentially stress relieved in the radial direction by local circumferential texture lines in the planar surface of the substrate. In the preferred embodiment the easy axis has a tendency to be the narrow axis of the grain which provides the benefits normally obtainable with small grain size, e.g. low noise, etc., without the usual reduction in thermal stability. The long axis of the grains, which is preferably oriented radially, allows a higher grain volume to be achieved which increases the thermal stability of the grains. With conventional grains with a circular cross-section, there is a trade-off between improving noise and decreasing thermal stability. The invention allows grains to be formed which have both low noise and high thermal stability.

Although the preferred embodiment uses circumferential texturing of the substrate surface for stress relief, any technique which anisotropically lowers the radial stress can be used such as nonmechanical methods employing heat.

A negative voltage bias is preferably used during growth of the underlayer to promote lattice expansion, strain and lattice defects in the underlayer and magnetic layer crystal structures.

DETAILED DESCRIPTION OF THE PREFERRED EMBODIMENTS

Figure 1:
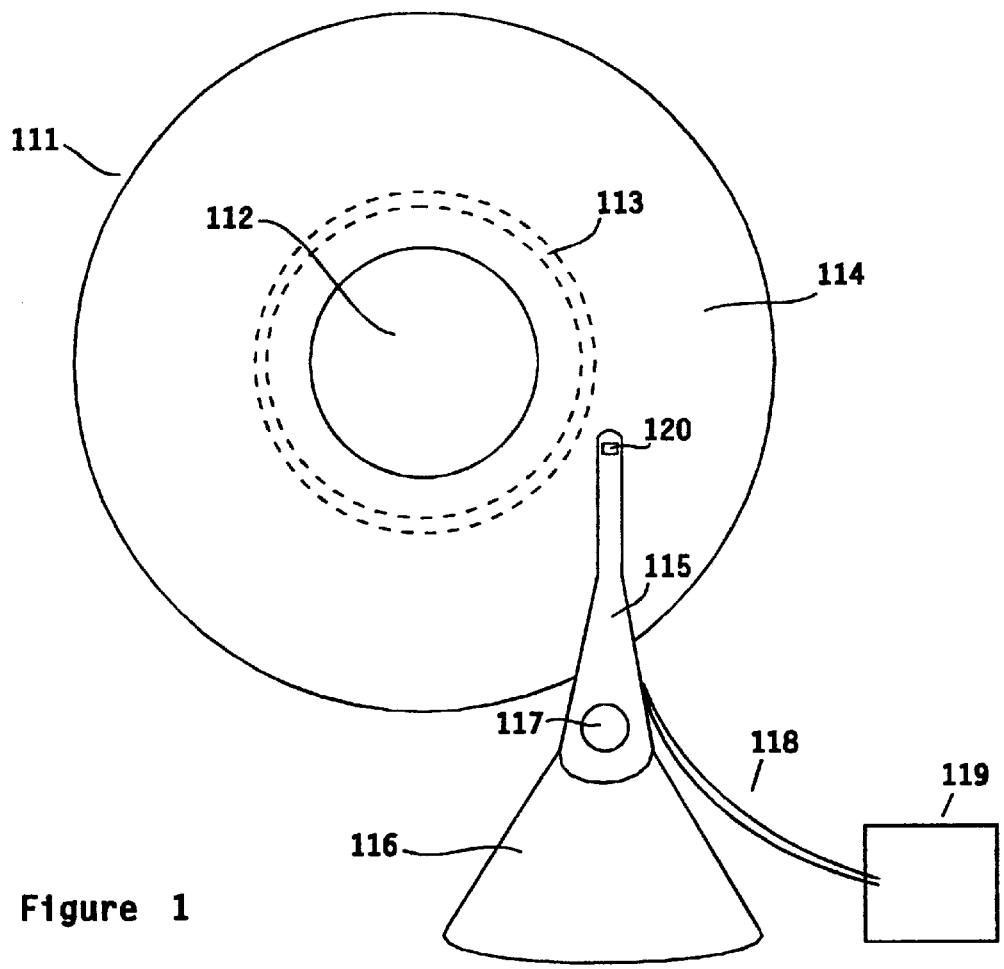
FIG. 1 illustrates a top view of a prior art disk drive with a rotary actuator useful in practicing the present invention.

An embodiment of the invention's thin film recording structure with a magnetic layer comprising acicular grains and uniaxial stress anisotropy will be referred to as a STRAG film. With the exceptions noted below, the substrate, optional seed layer, underlayer and protective overcoat are sputtered according to prior art methods known to those of skill in the art. The seed layer may be included or omitted according to prior art principles.

The alloy used for the magnetic layer must be specially selected to achieve the acicular grains. The magnetic material in the alloy is preferably cobalt. The alloy includes a glass forming (amorphizing) material to encourage small, well decoupled, acicular grains to grow. The magnetic alloy forms hexagonal-close-packed (hcp) crystals. A preferred magnetic alloy is a quaternary alloy of CoPtCrB, but numerous other alloys are expected to have similar behavior when used as described herein. The commonly used alloys in the prior art of magnetic recording is such as cobalt, platinum, chromium (CoPtCr) and CoPtCrTa will not produce the acicular grains of the invention. However, adding from 4–20 at.% of boron to CoPtCr, for example, results in an alloy which can produce the acicular grains when properly deposited. Other materials which can replace or be used in conjunction with boron to obtain the acicularity are believed to include glass forming materials such as phosphorus, carbon, silicon, $SiO_2$ and $B_2O_3$. It is well known that in typical disks available today the chromium in the CoCrX alloys segregates to the grain boundaries. In contrast, when deposited on the common underlayer materials, it is to be expected that the glass forming materials like boron will be substantially evenly distributed in the grains, but may have a tendency to nucleate at defect sites in the lattice structure—which may disrupt the distribution at least locally.

The nucleation and growth of the acicular grains can be achieved with the described alloys in the growth of ultrathin films on super smooth substrates, i.e. without circumferential texture. However, grain coalescence as the thickness of the film is increased, leads to spherical grains in the case of alloys with Mrt's in excess of 0.2 memu/cm$^2$ grown on "superfinished", i.e. extremely smooth substrates. The presence of the circumferential topographic features imparted on the substrate by polishing, on the other hand, function synergistically and unexpectedly to promote the acicular grain characteristics even for films with Mrt's around 1.0 memu/cm$^2$ when deposited as described herein.

The preferred orientation of the easy axis of the grains is influenced by the local substrate topography. While the thin films are being deposited, the reduced stress in the radial direction lowers the surface energy in this direction to facilitate more rapid growth of the grains in the radial direction. The result is the growth of small, magnetically decoupled, isolated, acicular grains with superior recording characteristics.

Radial stress can be relieved by appropriate circumferential texturing of the substrate surface which can be achieved using the method and apparatus of Jones, et al., as described in U.S. Pat. No. 5,490,809, but other polishing/texturing techniques, for example, using abrasive diamond slurries, may also be used. The surface topography of shallow circumferential grooves (nominal Rq roughness 15–25 A as measured by AFM) alone may be used, but may also be combined with additional topography modifications in other than the tangential direction. The R-max for a 400 micron length will typically be less than 10 nm. The horizontal peak-to-peak will preferably be less than 150 nm. The upper limit on roughness in a modern disk drive will be limited by the required flying height for the slider rather than the stress mechanisms. Existing polishing equipment imposes a practical limit on how smooth a disk can be and still have a regular circumferential texture, but there is no known lower limit on the circumferential texture roughness to achieve the desired stress relief.

In the preferred embodiment resulting grains in the magnetic layer will exhibit dimensions typically of approximately 5 nm×30 nm, so the long axis of the grains is relatively shorter than the horizontal distance from peak-to-peak in the texture, so that several grains may fall between peaks.

Using circumferentially textured disks prepared as described and a Cr underlayer, the anisotropy can be found by measuring the lattice parameter in the (100) plane both radially and tangentially, then computing the ratio (radial—tangential) divided by tangential. Values of this stress anisotropy can be expected to be approximately 0.2% to 0.3%.

The easy axis of conventional cylindrical magnetic grains is along a diameter of the cylinder. For longitudinal recording the easy axis is preferably in the plane of the film which implies that the planar surfaces of the grains are substantially parallel to the plane of the film. The acicular grains of the invention can also preferentially be oriented with the easy axis in the plane of the film and can be deposited with a non-random alignment which tends to be parallel to the local texture lines (which are preferably circumferential). In the preferred embodiment the narrow axis of the grains a tendency to be the magnetic easy axis. A quaternary boron alloy STRAG film on a circumferential textured prepared as described herein will show a narrow distribution of the C-axis alignments of the grains parallel to the texture lines. Where prior art alloys on circumferential texture substrates would show an 80 degree (at full width at half maximum) or larger Gaussian distribution under grazing incidence x-ray scattering (GIXS), STRAG films can be prepared with equal to or less than 70 degree distributions.

Acicularity may be present in STRAG films with random physical orientation, since conditions sufficient to achieve acicularity are not necessarily sufficient to achieve physical orientation of the grains. The primary additional condition for orienting the acicular grains is believed to be matching of the "A" to "C" axis ratio of the magnetic alloy to lattice parameters of the anisotropically stressed crystal structure on which the magnetic alloy nucleates. Thus, the physical orientation of the acicular grains with respect to texture lines on disks is related not only to the stress anisotropy of the alloy, but also to whether the alloy's "A" to "C" axis ratio of the corresponding surface of the magnetic grains match the lattice parameters of the anisotropic nucleating surface, e.g. the (200) surface of Cr(X). Better lattice matching of the magnetic alloy surface to the Cr surface provides better control of the alloy grains. Magnetic alloys other than quaternary boron with A-axis to C-axis ratios which closely match the anisotropic Cr(200) surface can also be used to control the physical orientation of the magnetic-alloy grains on circumferentially textured disks. The "A" to "C" axis ratio is principally controlled through composition, and as such provides the possibilities of using a range of alloy compositions in physical oriented STRAG films.

The fact that the easy axis has a tendency to be the narrow axis of the acicular grains is significant. Much of the literature of magnetic thin films for recording states that small grain size is preferable to allow increased areal density, low noise, etc. However, more precisely, it is the dimension of the grain along the easy axis that is the most important factor in achieving the benefits normally associated with small grain size. The acicular grains described herein have a typical dimension of 5 nm along the easy axis. For typical films in the industry today, the dimension along the easy axis would be expected to be closer to 15 nm. Thus, the acicular grains have an effective recording grain size which is smaller than typical prior art films.

It has also been widely discussed that the ultimate limit for useful grain size and, therefore, areal density will be bounded by the point at which the grains are so small that their magnetic domains are not sufficiently thermally stable to allow long term storage of data. As this so-called superparamagnetic point is approached the time that the magnetic domains will hold their states approaches zero. The thermal stability is proportional to the grain volume (V), i.e. $K_u V/kT$. For a typical prior art cylindrical grain with an average diameter of 10.3 nm in a 13 nm thick film, V=1083 $nm^3$. For a rough approximation the acicular grains can be assumed to be rectilinear, and therefore, a 5 nm * 30 nm * 13 nm grain gives V=1950 $nm^3$. Thus the acicular grains may have an increased volume and therefore increased thermal stability while the effective grain size along the easy axis is reduced.

It should be noted that the acicular grains of the STRAG films are superior to prior art acicular grains of magnetic iron alloys in which the easy axis is the long axis of the grains. When the long axis of an acicular grain is the easy axis, the benefits described above for a STRAG film are not obtained. In fact, the prior art acicular grain films have higher noise and lower thermal stability than cylindrical grains.

A practical way of modifying the crystal structure, the flatness and defect content of the underlayer is to utilize negative voltage bias on the substrate during growth of both the underlayer and the magnetic layer, and relatively high temperature. The optimum temperature, as with most sputtering parameters, will vary from system to system, but will be expected to be from 150 to 500 C. The negative voltage bias is preferably used during the growth of the underlayer for the CoPtCrB alloy. The required negative bias voltage ranges from a minimum value needed to incorporate a sufficient amount of the sputtering gas e.g. argon, into the underlayer. A maximum value is limited by resputtering effects, etc. and may range from about a 150 v to 500 v, but is preferably about 300 v. The actual optimum voltage will vary from one sputtering machine to another. The bias voltage is used to increase the average energy level of the ions arriving at the film surface and, therefore, the amount of the sputtering gas being incorporated into the underlayer. Argon is the most commonly used sputtering gas and the following will assume that argon is being used, but any other sputtering gas may also be used. The amount of argon in the underlayer should be at least 1 at.%. The argon incorporation increases the stress in the lattice structure and therefore aids in the development of the acicular grains. The bias voltage should be set empirically to be at least high enough to get 1 at.% argon in the underlayer. The upper limit on the amount of argon in the underlayer is probably determined by stability. Applicants have successfully used films with about 12 at.% argon.

The sputter deposition of a Cr underlayer under optimum growth conditions of temperature and bias promotes in-plane lattice expansion, strain and lattice defects in the underlayer crystal structure. Although pure Cr is a common underlayer material, CrV, CrTi as well as numerous other materials have been reported in the prior art literature as being useful for underlayers. Thus, in addition to Cr, other known underlayer materials should be expected to work in the invention as well. Note that although it is not conventional to list the sputtering gas as part of the underlayer or magnetic layer, when the high percentages of argon, etc. are used, it might be more descriptive to call the underlayer alloy CrAr, CrArV, etc.

In general standard sputtering techniques are used to deposit each of the thin film layers of a disk embodying the invention. The bias and temperature conditions have been noted. In addition, the oxygen or impurities in the underlayer should be kept low, since increased oxygen is known to affect magnetic properties and may alter crystalline growth characteristics in the underlayer. As noted the argon content in the underlayer should be kept relatively high.

Figure 3:
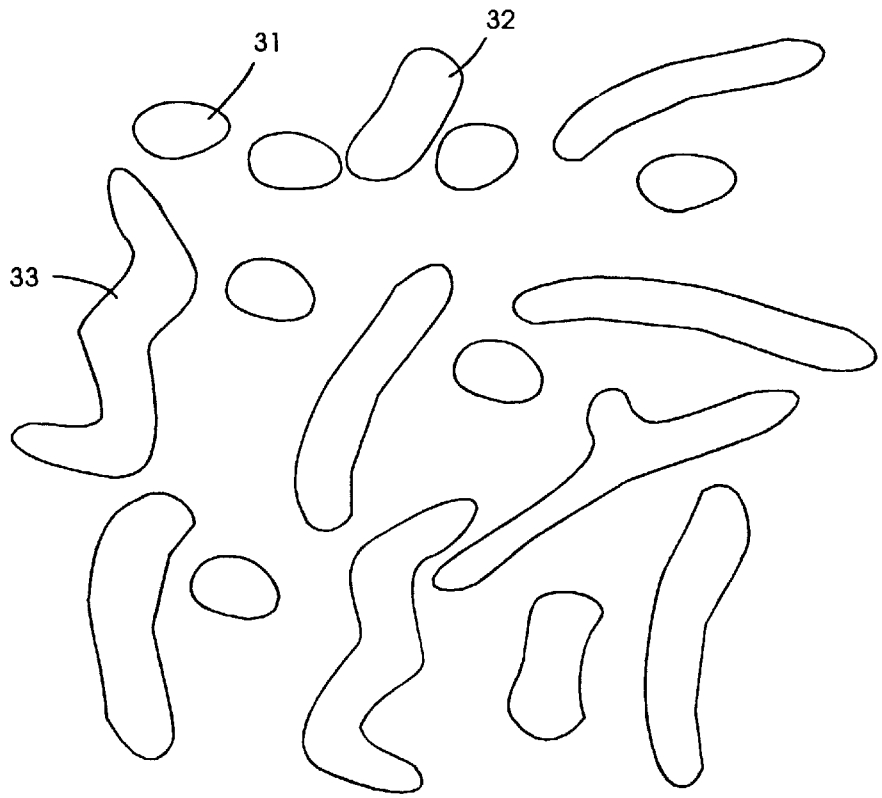
FIG. 3 illustrates the acicular grain shape of the magnetic film of the invention in early growth stage on a smooth substrate.

When formed according to teachings herein, the recording alloy develops an unique grain morphology which is best described as an acicular grain structure. FIG. 3 illustrates the grain shape by showing a through-foil view of a CoPtCrB film in the initial stages of growth. The growth pattern begins as substantially spherical shapes 31 which coalesce into larger acicular, elongated grains. Element 32 shows the approximate shape of two coalesced spheres. As more and more spheres coalesce the grains form into branched chains which tend to remain only as wide as a single sphere, but may six or more spheres long 33. For a typical film of the invention the grain dimensions range from approximately 2.5 to 7 nm in the narrow axis (wide) and 7 to 40 nm long which leads to typical acicular grains. The resulting grains exhibit aspect ratios ranging from 1.2 to 6 when the boron content varies from 3 to 20 at.% when the other teachings described herein are followed. A five or six to one aspect ratio is common. The mean aspect ratio can vary from 2 to 6. Any aspect ratio greater than one would still show some improvement over cylindrical grains at least in terms of thermal stability.

The magnetic easy axis is aligned preferentially along the short axis in the case of the CoPtCrB alloy. This is not to say that every or even most grains will have a detectable C-axis aligned with the narrow axis, but so long as a significant number of grains have the C-axis aligned with the narrow axis, the benefits of the invention can be obtained. In this context "significant" simply means that one or more recording characteristics such signal to noise ratios or soft error rates of the film are improved. It is not necessary that coercivity or Mrt be improved.

When the stress is decreased in the radial direction, the magnetic axis becomes preferentially oriented along the disk tangential direction, i.e. along the on-track direction for the disk drive. An orientation ratio (OR) greater than one may result. In the preferred embodiment described herein, an OR of coercivity and/or Mrt of approximately 1.2 can be achieved. Without the anisotropic stress relief, the grains may initially be acicular but will tend to become more regular as the film grows to a useful thickness for magnetic recording. The grains in the completed film will not be uniform in size or shape. The benefits of the invention can be achieved with a distribution of grain shapes and sizes, since each bit is recorded using a significant number of grains in current technology.

Figure 4:
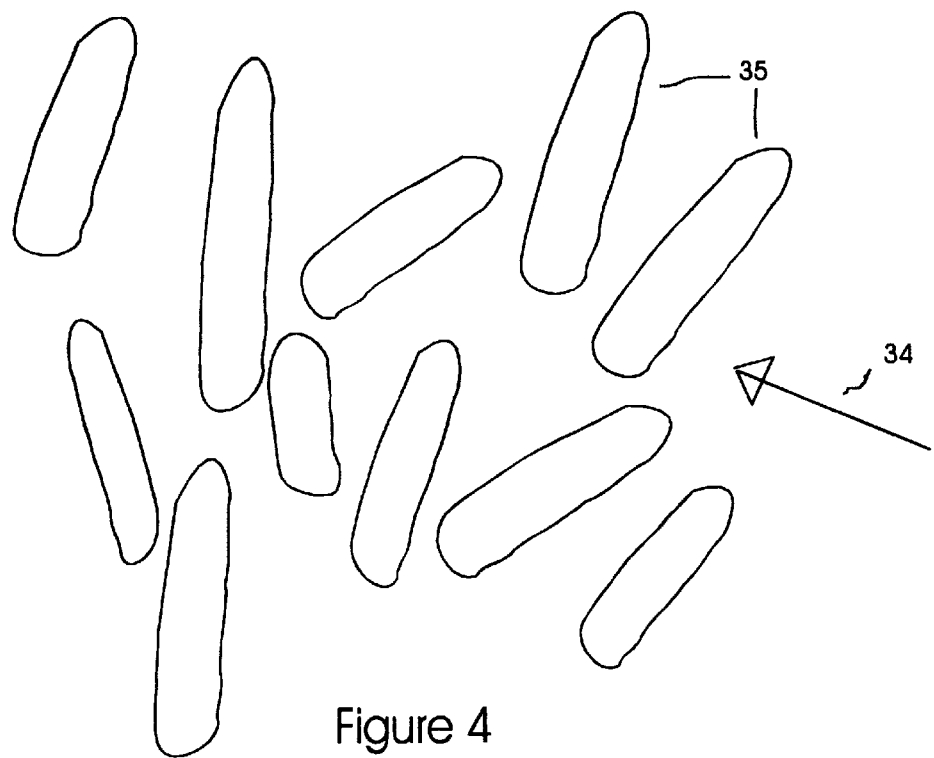
FIG. 4 illustrates the acicular grain shape of the magnetic film of the invention on a textured surface.

In FIG. 4 arrow 34 shows the direction of the circumferential texture grooves. Applicants have found that there is a strong tendency for alignment of the long axis of the acicular grains 35 orthogonal to the groove direction as is shown in FIG. 4. Unlike the early grains shown in FIG. 3, the grains in FIG. 4 illustrate that on a circumferentially textured substrate have a reasonably well constrained shape and size although variation still exists.

The tendency for alignment of the grains 35 with the groove direction leads to a dense array of these elongated grains in the magnetic transition zone between dibits. This results in narrower transition parameters and consequently lower recording noise at high density. One characteristic of the acicular grains in STRAG films is that domain wall expansion is reduced due to inhibition of the expansion along the long axis on account of the pinning effects of the texture lines. This reduces irregularities of the outer edges of the recorded bits and improves servo performance and reliability. These unique acicular grain characteristics dramatically improve the written track edge definition with resulting improvements in side-track quality. These unique structural characteristics of the STRAG films support the improvements in media for longitudinal recording in higher areal densities, superior on track error rates, improved servo reliability, higher data rates, improved thermal stability, and lower noise. It also follows that the acicular grains become superparamagnetic at a lower easy axis dimension than spherical grains.

Figure 2:
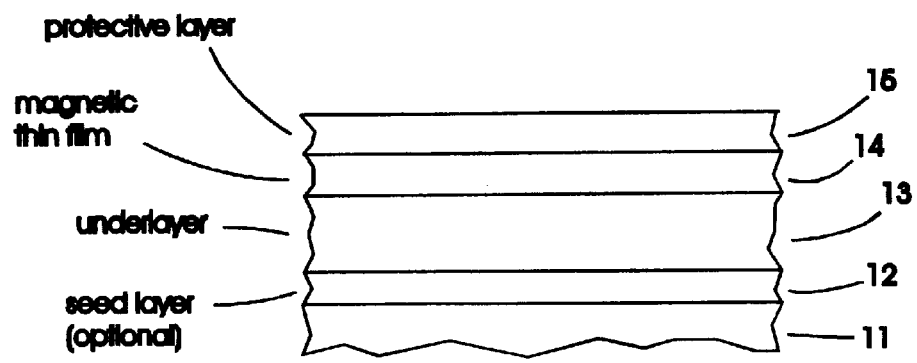
FIG. 2 illustrates the layer structure of a thin film magnetic disk embodying the invention.

FIG. 2 illustrates the cross sectional layer structure of an embodiment of the invention in a thin film magnetic disk. The thin film layers will be sputter deposited onto at least one and preferably both planar surfaces of the substrate 11 to form the data recording area of the disk. The shading is used only to differentiate the layers and not to indicate color or specific composition. The invention may be used with substrates made of AlMg/NiP, glass, SiC/Si or any other suitable material. The substrate 11 in the preferred embodiment is composed of a AlMg alloy base with an electroless NiP smoothing/hardening surface layer. The seed layer 12 is an optional layer that may be used to improve magnetic properties such as coercivity. The seed layer 12 is most commonly when the substrate surface is nonmetallic, e.g. glass. The seed layer may be any one of the materials which are known in the prior art to be useful as seed materials. For example, a thin seed layer consisting of tantalum (Ta) may be used with a suitable underlayer and a CoPtCrB magnetic layer. The seed layer of Ta promotes the [200] orientation in the underlayer. In contrast, a NiAl seed layer on a glass substrate can be expected to have a mixed PO of [211] and other orientations such as [110].

The underlayer 13 is deposited onto the seed layer if present or directly onto the substrate and is conventionally a nonmagnetic material such as chromium or a chromium alloy, e.g. CrTi. The PO of the underlayer is influenced by the PO of the seed layer if present. When NiAl is the seed layer, the underlayer has a PO of [211] possibly mixed with some [110] orientations. The [211] PO ultimately promotes the [10$\bar{1}$0] PO in the magnetic layer. The Ta seed layer will promote a PO [200] in a Cr based underlayer. The [200] PO in the underlayer is also expected when the seed layer is omitted and the Cr based underlayer is deposited directly onto a NiP surface as indicated above. The [200] PO promotes the [11$\bar{2}$0] PO in the magnetic layer.

The thicknesses of the standard seed, underlayer and magnetic layers are not believed to be critical for practicing the invention and can be determined according to prior art principles. Therefore, the thickness ranges given below are merely included as illustrative guidance. Typical thickness ranges currently in use are: seed layer between 2 and 50 nm, underlayer between 10 and 80 nm and magnetic layer between 5 and 50 nm. Variations in the thickness of the underlayer result in changes in the magnetic characteristics such as coercivity. A typical value for the thickness of the underlayer is about 50 nm.

The QB alloy comprises 4 to 12 at.% platinum, 10 to 23 at.% chromium and 2 to 20 at.% boron with the rest being Co. An example of a complete layer structure of a disk embodying the invention would be: AlMg/NiP—Cr—CoPtCrB—overcoat.

The use, composition and thickness of the overcoat 16 are not critical in practicing the invention, but by way of an example a typical thin film disk might use an overcoat of carbon optionally doped with hydrogen and/or nitrogen. The overcoat is typically less than 15 nm thick.

All of the layers described above from the seed layer to the overcoat can be sputtered in a continuous process in either an in-line sputtering system or a single disk system. There are also commercially available single disk systems with 6 or more target capacity with the capability to fabricate disks with an onset layer according to the invention. Starting with a substrate which can be AlMg/NiP, glass or any other suitable material, the layers are sequentially sputter deposited. The seed layer is deposited first for nonmetallic substrates, followed by the underlayer, then the onset layer, then the magnetic layer. The optional last step deposits a protective overcoat. The sputter deposition of each of the layers can be accomplished using standard targets and techniques known to those in the field with the modifications described above.

While the compositions listed above have been given without regard to contamination percentages, it is known to those skilled in the art that some contamination is normally if not always present in thin films. Sputtering targets are typically specified as 99.9% or greater purity, but the resulting films may have much lower purity due to contamination in the sputtering chamber or other factors. For example, contamination by air in the chambers might result in measurable amounts of oxygen and/or hydrogen being incorporated into the film. For some carbon films 5 at.% hydrogen contamination has been measured in a typical sputtered layer. It is also known that some small amount of oxygen is normally found in Cr targets and in the resulting Cr layer. Contamination levels were not specifically measured in the disk samples described and, therefore, were assumed to be within normal ranges for sputtered thin film disks expected by those skilled in the art.

The thin film disk made according to the invention can be used for storing data in typical disk drives using either magnetoresistive (MR), giant magnetoresistive (GMR) or inductive heads and can be used in contact recording or with flyable heads. The read/write head is positioned over the rotating disk in the standard manner to either record or read magnetic information.

FIG. 1 is a top view illustrating a prior art disk drive with a rotary actuator useful in practicing the present invention. The system comprises one or more magnetic recording disks 111 mounted on spindle 112 which is rotated by an in-hub electrical motor (not shown). An actuator assembly 115 supports a slider 120 which contains one or more read/write heads. The assembly may be composed of a plurality of actuators and sliders arranged in a vertical stack with the actuators supporting the sliders in contact with the surfaces of the disks when the disks are not rotating or being unloaded to avoid contact. A voice coil motor (VCM) 116 moves the actuator assembly 115 relative to the disks by causing the assembly to pivot around shaft 117. The heads are typically contained in air bearing sliders adapted for flying above the surface of the disks when rotating at sufficient speed. In operation, when the sliders are flying above the disks the VCM moves the sliders in an arcuate path across the disks allowing the heads to be positioned to read and write magnetic information from circular tracks formed in the data area 114 which is coated with the thin films which will be described in more detail below. Electrical signals to and from the heads and the VCM are carried by a flex cable 118 to the drive electronics 119. When not operating and during periods when the rotation of the disks is either starting or stopping, the sliders may be positioned in physical contact with the surface of the disks in a landing zone or contact start/stop (CSS) area 113 which is not used for data storage even though the magnetic coating extends over this area. It is also known to remove the sliders from the disks during nonoperating periods using an unload ramp. Although the disk drive has been described with air bearing sliders the disk of the present invention may easily be used in other storage devices having near contact, or contact recording sliders.

While the preferred embodiments of the present invention have been illustrated in detail, alternative embodiments of the invention are realizable without deviating from the scope and spirit of the invention.

What is claimed is:

1. A thin film magnetic recording medium having a magnetic material disposed on a planar surface of a substrate disk, comprising:

a thin film magnetic layer with a crystal structure having anisotropic inplane stress with a radial stress being less than a tangential stress;

the thin film magnetic layer including a glass forming material alloyed with a magnetic material; and the thin film magnetic layer being composed of acicular grains having aspect ratio greater than one.

2. The thin film magnetic recording medium of claim 1 wherein the magnetic material is cobalt, the magnetic layer comprises hcp unit cells with a C-axis and a C-axis distribution in a tangential direction on the disk is less than or equal to 70 degrees.

3. The thin film magnetic recording medium of claim 1 wherein the glass forming material is boron or an oxide of boron.

4. The thin film magnetic recording medium of claim 1 wherein the glass forming material is an oxide of silicon.

5. The thin film magnetic recording medium of claim 1 wherein the magnetic layer further comprises cobalt and boron.

6. The thin film magnetic recording medium of claim 5 wherein the thin film magnetic layer further comprises 4 to 12 at.% platinum, 10 to 23 at.% chromium and 2 to 20 at.% boron with the rest being cobalt.

7. The thin film magnetic recording medium of claim 1 wherein the glass forming material comprises phosphorus, carbon, or silicon.

8. The thin film magnetic recording medium of claim 1 wherein the acicular grains include grains with hcp crystals arranged with a C-axis of the hcp crystals being orthogonal to a long axis of the grain.

9. The thin film magnetic recording medium of claim 1 wherein the substrate is circumferentially textured with substantially parallel texture lines.

10. The thin film magnetic recording medium of claim 9 wherein the substantially parallel texture lines are less than 150 nm apart in the horizontal plane from peak-to-peak and have a roughness Rq less than 30A.

11. The thin film magnetic recording medium of claim 9 wherein the glass forming material is boron or an oxide of boron.

12. The thin film magnetic recording medium of claim 11 wherein the acicular grains are formed from a plurality of hcp crystals arranged with a C-axis of the hcp crystals being orthogonal to a long axis of the grain and a mean aspect ratio of the acicular grains is greater than two.

13. The thin film magnetic recording medium of claim 12 wherein the acicular grains include grains which have a long axis and a narrow axis which are both substantially parallel to the planar surface of the substrate, and an easy axis of magnetization is along the narrow axis.

14. The thin film magnetic recording medium of claim 13 wherein the acicular grains have a typical dimension of 5 nm or less along the easy axis.

15. The thin film magnetic recording medium of claim 13 wherein the easy axis is preferentially aligned along a circumference of the disk resulting in an orientation ratio greater than one.

16. The thin film magnetic recording medium of claim 1 wherein the acicular grains include grains which have a long axis and a narrow axis which are both substantially parallel to the planar surface of the substrate; the acicular grains include grains which comprise a plurality of hcp crystals arranged with a C-axis of the hcp crystals being orthogonal to the long axis of the grain; and which have an easy axis of magnetization along the narrow axis which is preferentially aligned along a circumference of the disk resulting in an orientation ratio greater than one and wherein a mean aspect ratio of the acicular grains is greater than two.

17. The thin film magnetic recording medium of claim 16 wherein the substrate is circumferentially textured with substantially parallel texture lines which are less than 150 nm apart in the horizontal plane from peak-to-peak and have a roughness Rq less than 30A.

18. The thin film magnetic recording medium of claim 13 wherein the C-axis distribution in a tangential direction is less than or equal to 70 degrees.

19. A disk drive comprising:
   a spindle;
   a motor for rotating the spindle; and
   a thin film magnetic disk mounted on the spindle, the disk comprising a substrate having a planar surface, a thin film magnetic layer with a crystal structure having anisotropic inplane stress with a radial stress being less than a tangential stress, the thin film magnetic layer including a glass forming material alloyed with a magnetic material, and the thin film magnetic layer being composed of acicular grains having an average aspect ratio greater than one; and
   a head for reading magnetic data from the disk while rotating.

20. The disk drive of claim 19 wherein the glass forming material is boron or an oxide of boron.

21. The disk drive of claim 19 wherein the glass forming material is an oxide of silicon.

22. The disk drive of claim 19 wherein the magnetic layer further comprises cobalt, platinum, chromium and boron with the rest being cobalt.

23. The disk drive of claim 19 wherein the crystal structure is hcp and has a $[10\bar{1}0]$ or a $[11\bar{2}0]$ preferred orientation.

24. The disk drive of claim 19 wherein the acicular grains are formed from a plurality of hcp crystals arranged with a C-axis of the hcp crystals being orthogonal to a long axis of the grain.

25. The disk drive of claim 19 wherein the substrate is circumferentially textured with substantially parallel texture lines.

26. The disk drive of claim 25 wherein the substantially parallel texture lines are less than 150 nm apart in the horizontal plane from peak-to-peak and have a roughness Rq less than 30A.

27. The disk drive of claim 24 wherein the glass forming material is boron or an oxide of boron.

28. The disk drive of claim 26 wherein the acicular grains are formed from a plurality of hcp crystals arranged with a C-axis of the hcp crystals being orthogonal to a long axis of the grain.

29. The disk drive of claim 28 wherein the acicular grains include grains which have a long axis and a narrow axis which are both substantially parallel to the planar surface of the substrate, and which have an easy axis of magnetization along the narrow axis.

30. The disk drive of claim 29 wherein the acicular grains have a typical dimension of 5 nm or less along the easy axis.

31. The disk drive of claim 29 wherein the easy axis is preferentially aligned along a circumference of the disk resulting in an orientation ratio greater than one.

32. The disk drive of claim 19 wherein the acicular grains include grains which have a long axis and a narrow axis which are both substantially parallel to the planar surface of the substrate; and which comprise a plurality of hcp crystals arranged with a C-axis of the hcp crystals being orthogonal to the long axis of the grain; and which have an easy axis of magnetization along the narrow axis which is preferentially aligned along a circumference of the disk resulting in an orientation ratio greater than one.

33. The disk drive of claim 32 wherein the substrate is circumferentially textured with substantially parallel texture lines which are less than 150 nm apart in the horizontal plane from peak-to-peak and have a roughness Rq less than 30A.

34. The disk drive of claim 19 wherein the thin film magnetic layer further comprises 4 to 12 at.% platinum, 10 to 23 at.% chromium and 2 to 20 at.% boron with the rest being cobalt.

35. The disk drive of claim 19 wherein the anisotropic inplane stress is greater than 0.2%.

36. A method of manufacturing a thin film disk comprising the steps of:
   sputtering an underlayer including chromium onto a circumferentially textured surface of a substrate while applying a negative voltage bias on the surface of the substrate;
   sputtering a magnetic layer onto the underlayer, the ferromagnetic layer including cobalt and a glass forming material, the magnetic layer comprising hexagonal closed packed crystallographic unit cells with a C-axis preferred orientation in a surface plane of the disk, the unit cells forming acicular grains with the C-axis orthogonal to a long axis of the acicular grains.

37. The method of claim 36 wherein the glass forming material is boron or an oxide of boron.

38. The method of claim 36 wherein the glass forming material is an oxide of silicon.

39. The method of claim 36 wherein the acicular grains include grains which have a long axis and a narrow axis which are both substantially parallel to the planar surface of the substrate; the acicular grains comprise a plurality of hcp crystals arranged with a C-axis of the hcp crystals being orthogonal to the long axis of the grain; an easy axis of magnetization of a grain is along the narrow axes which are preferentially aligned along a circumference of the disk resulting in an orientation ratio greater than one.

40. The method of claim 36 wherein the negative voltage is from 150 v to 500 v.

41. The disk drive of claim 19 wherein the glass forming material includes boron and a mean aspect ratio of the acicular grains is greater than two.

* * * * *